July 2, 1940.　　　　F. VETORINO　　　　2,206,439
WORK SUPPORT FOR WELDING APPARATUS
Filed March 12, 1937　　　3 Sheets-Sheet 1
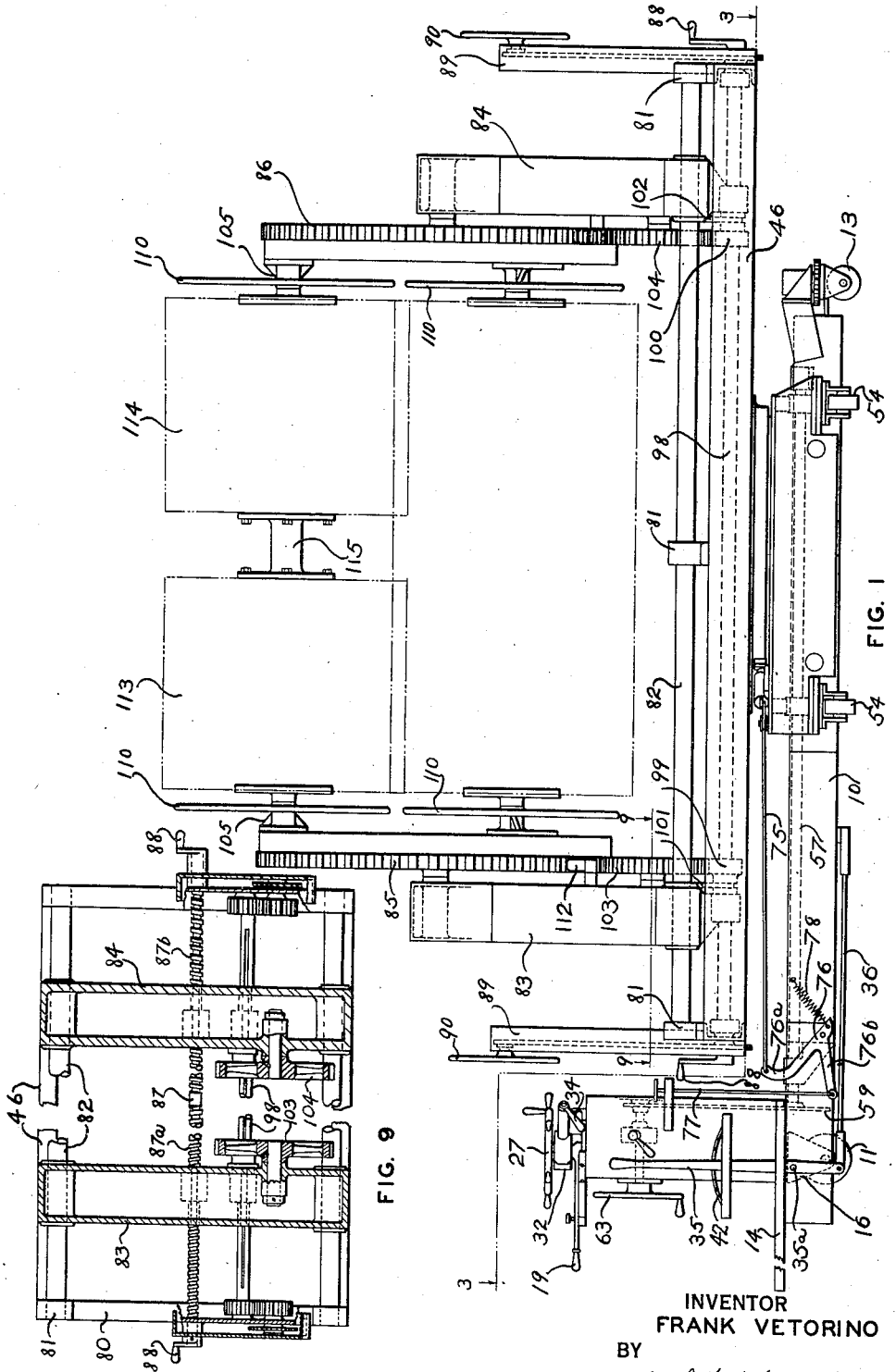
INVENTOR
FRANK VETORINO
BY
Brockett, Hyde, Higley & Meyer
ATTORNEYS July 2, 1940.  F. VETORINO  2,206,439
WORK SUPPORT FOR WELDING APPARATUS
Filed March 12, 1937    3 Sheets-Sheet 2

INVENTOR
FRANK VETORINO
BY
Brockett Hyde, Higby&Wager
ATTORNEY

July 2, 1940.　　　　　F. VETORINO　　　　　2,206,439
WORK SUPPORT FOR WELDING APPARATUS
Filed March 12, 1937　　　3 Sheets-Sheet 3
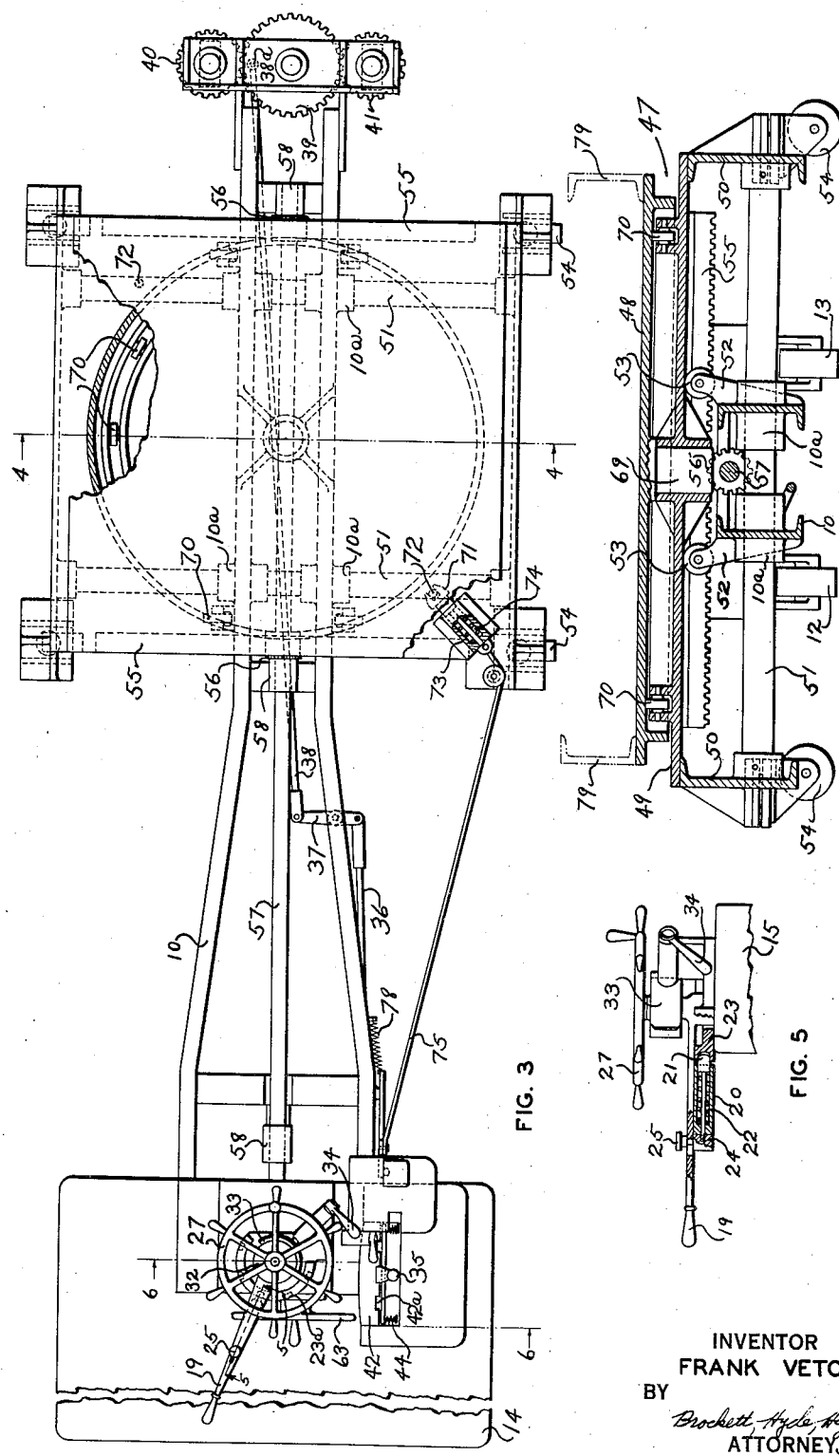
INVENTOR
FRANK VETORINO
BY
Brockett, Hyde, Hyby & Meyer
ATTORNEYS Patented July 2, 1940

2,206,439

UNITED STATES PATENT OFFICE 2,206,439

WORK SUPPORT FOR WELDING APPARATUS

Frank Vetorino, Cincinnati, Ohio, assignor to The American Laundry Machinery Company, Norwood, Ohio, a corporation of Ohio Application March 12, 1937, Serial No. 130,541

6 Claims. (Cl. 29—89)

This invention relates to work supporting apparatus for presenting large and cumbersome work pieces to a more or less stationary fabricating tool.

While my invention may have other applications, I have illustrated apparatus for supporting metallic cylinders for presentation to a fixed fabricating tool, such as a welding machine. Such cylinders are used in washing and dry cleaning apparatus and are generally cumbersome and difficult to handle during assembly and fabrication. A very satisfactory manner of constructing such cylinders consists in welding as many of the metallic parts as possible in their positions in the cylinder structure. These welding operations can be satisfactorily carried out only if the cumbersome work can be efficiently handled during the progressive assembly and welding of the component parts. An object of the present invention is to improve the apparatus for handling such large pieces of work during such a fabricating operation.

One of the objects of the present invention is to provide novel apparatus for supporting one or more cylinder assemblies on a truck chassis movable about on a floor surface toward and from a welding tool.

Among the novel features of the apparatus here disclosed are means for driving the truck chassis or parts thereof along fixed lines and arcs so that welding operations may be carried out upon straight or circumferential seams, or in other words, that a line of spot welds may be formed upon straight seams parallel to fixed lines of travel of the truck chassis or work-carrying parts thereof, or upon arcuate seams about fixed work-supporting pivots.

Another feature is the provision for the indexing of the truck travel along such lines so that the work piece is moved predetermined distances between successive fabricating operations. This makes it possible to spot the welds along a seam at certain fixed distances from each other.

Other features of my invention include placing the work holding apparatus upon a carriage which is movable laterally relative to the truck chassis so that certain movements of the work piece to and from the fabricating tool may be accomplished without disturbing the main setting of the truck chassis.

Another feature of my invention is the provision of a rotatable turret on the truck chassis for holding one or more work pieces and the provision of novel structure for supporting the work pieces relative to the rotatable turret so that the load may be controlled in various positions of the turret.

Another object of my invention is to support a plurality of work pieces on the apparatus with means for presenting the work pieces selectively or successively to a fabricating tool so that a plurality of operations requiring changes in the fabricating tool may be carried out, each operation being performed on all of the work pieces before the tool is changed to perform other operations, thus cutting down the number of tool set-ups for fabricating a plurality of work pieces.

Another feature of my invention is the arrangement of a plurality of work pieces on the supporting apparatus so that one piece is presented at an assembly station for an assembly or fitting operation while another piece is being presented to the fabricating tool. The arrangement includes structure by which these operations may progress during the assembly of the completed structure so that assembly and fabricating operations follow each other step by step.

Other novel features reside in the various details of structure by which I am able to carry out the above described objects and to provide the novel features set forth, all of which will be more fully disclosed in the specification and drawings and the essential features of which will be embodied in the claims.

In the drawings:

Fig. 1 is a side elevation of my novel work supporting apparatus and wherein a plurality of cylinders are indicated in position by dash-dot lines;

Fig. 3 is an enlarged plan view in section taken on the line 3—3 of Fig. 1;

Fig. 4 is an enlarged sectional view taken on the line 4—4 of Fig. 3;

Fig. 5 is an enlarged side view of a portion of the left end of Fig. 1 with a part in section taken on the line 5—5 of Fig. 3 to show the indexing arrangement for the steering mechanism;

Fig. 9 is a detail sectional view taken on the line 9—9 of Fig. 1; while

Figure 10:
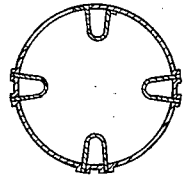
Figs. 10 and 11 are diagrammatic transverse sections through two types of cylinder structure.

In the embodiment shown, I provide an elongated truck chassis having a frame 10 supported at the control end of a caster 11 and at the opposite end by casters 12 and 13. At the control end of the chassis is provided a platform 14 upon which an operator may stand, and mounted upon a frame 15 is control mechanism by which the operator may control many of the movements of the apparatus from his position on the platform. Caster 11 is journalled in a bracket 16 which carries mechanism by which the caster may be steered and may be driven in any of its positions.

The mechanism for steering th caster 11 comprises a hollow shaft 17 journalled in the frame 15 at 17a and 17b. On the upper end of this shaft is a hub 18 rigid therewith to which is secured a steering handle 19. On the under side of this handle is a casing 20 housing a plunger 21 which his biased by the spring 22 into engagement with one or the other of the notches 23a in an indexing bracket 23. A block 24 secured to the rear end of the plunger 21 is provided with a button 25 which operates in a slotted portion of the handle 19. By moving the button 25 radially outward the plunger 21 is withdrawn from the notches 23 and movement of handle 19 will steer the caster 11 and by engaging the plunger 21 in any of the desired notches 23a the truck may be set for movement in a straight line or in various diagonal directions.

The truck chassis is propelled by the driving of caster 11. This is accomplished by means of shaft 26 which is housed in the hollow shaft 17. Shaft 26 has keyed thereto at its upper end a handwheel 27 and at its lower end a pinion 28. This pinion engages a pinion 29 journalled in the bracket 16. Rotatable with this latter pinion is a bevel pinion 30 which engages a bevel pinion 31 mounted on the caster 11. It is thus obvious that by rotation of the handwheel 27 the caster 11 may be driven in any of its steered positions. It will be noted in Fig. 3 that handwheel 27 has a plurality of spokes set at 60° intervals. I have arranged the apparatus so that movement of handwheel 27 60° moves the truck chassis a fixed number of inches so that the handwheel 27 forms an indexing apparatus by which the operator may cause an inching movement of the truck chassis measured by the spokes of wheel 27. On shaft 26 is secured a brake drum 32 adapted to coact with a brake shoe 33 which is controlled by handle 34. By setting this brake the truck chassis is held against movement when desired.

Steering of the casters 12 and 13 may be accomplished from the operator's platform by means of the control handle 35. This handle is pivotally mounted on the frame at 35a and at its lower end is pivotally connected with a tie rod 36. This rod in turn is connected to one end of lever 37 which is pivotally mounted on the frame 10 intermediate its ends. At its other end this lever is connected with the tie rod 38 which extends to a pivotal connection 38a on the under side of gear 39 mounted on a cross member of the frame 10. This gear meshes with pinions 40 and 41 rotatable respectively with casters 12 and 13. Thus, by the movement of the control handle 35 the casters 12 and 13 are simultaneously moved in any desired direction. Handle 35 may be secured in a variety of positions by being retained in the notches 42a of a bar 42. The handle 35 is biased toward the notches by a bar 43 which is biased toward the left as viewed in Fig. 6 by the springs 44 which are carried by the stud bolts 45.

On an elongated bed or frame 46 the work pieces are mounted in a manner later described. Means is provided for moving this frame and the work supported thereby laterally of the chassis 10 and for rotating the frame 46, both of which movements are desirable in presenting the work to the fabricating tool. In the structure shown a carriage 47 is mounted for movement laterally of the chassis 10 and upon this carriage is mounted a turret 48 for the rotation of the frame 46.

The carriage 47 comprises a base plate 49 connecting side channel members 50. Means is provided for fixing the position of carriage 47 longitudinally of the chassis 10 while at the same time permitting carriage movement transversely of the chassis. The means shown comprises the bars 51 which extend between the channel members 50 transversely of the chassis 10 and extending through bosses 10a on said chassis. The bars 51 are slidable in the bosses 10a and thus hold the carriage in position longitudinally of the chassis during the lateral movement of the carriage. On brackets 52 of the chassis frame are mounted rollers 53 which engage the under side of plate 49 and support this plate in parallel relation to the bars 51 so as to take all strain from these bars and permit them to perform their guiding function easily. Means is provided for supporting the load on the carriage when the center of gravity thereof moves outside the area of the chassis frame. This means comprises a plurality of casters 54 mounted on the laterally outermost parts of the carriage 47 in a manner to permit swiveling.

Drive means is provided for moving the carriage 47 laterally. This means comprises racks 55 secured to the under face of plate 49 and engaged by pinions 56 which are keyed to shaft 57 running longitudinally of the truck chassis. This shaft has suitable bearings 58 and extends to the control end of the chassis where it is provided with a sprocket 59 which in turn is driven by chain 60 from sprocket 61 on shaft 62 which is journalled in the frame 15. On the end of shaft 62 toward the operator is fixed handwheel 63 by which the shaft may be rotated, thus providing a drive for moving carriage 47 laterally of the truck chassis. A brake shoe 64 engages a suitable brake drum on shaft 62 so that when the brake is engaged the carriage 47 is held against lateral movement.

Figure 6:
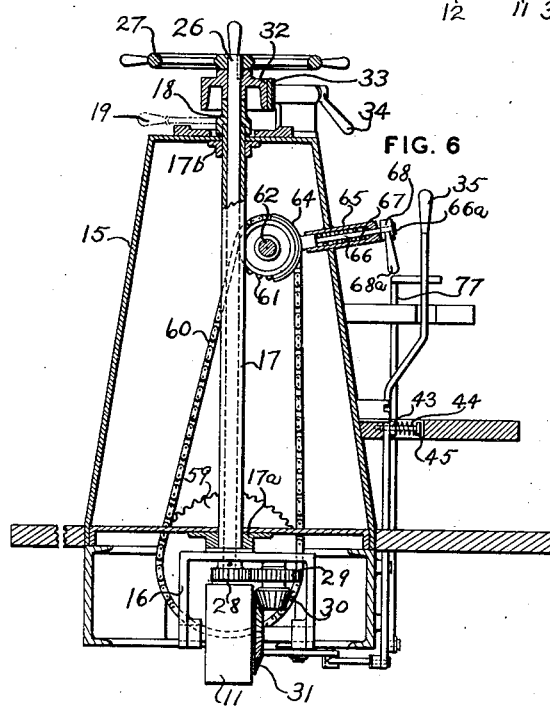
Fig. 6 is an enlarged detail sectional view taken on the line 6—6 of Fig. 3.
Figure 7:
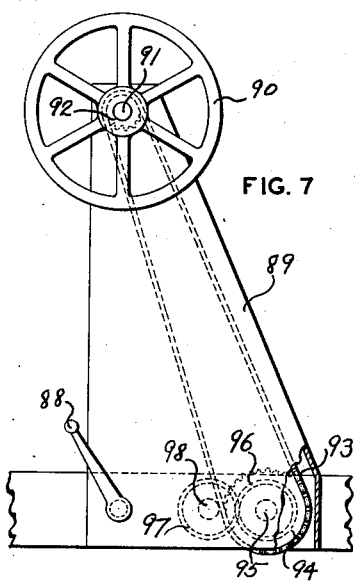
Fig. 7 is an enlarged detail front view of the work holder revolving mechanism.

The structure by which brake shoes 64 and 33 are operated is similar and is best shown in Fig. 6. In casing 65 is housed a rod 66 connected with the brake shoe. The rod and shoe are biased in brake engaging direction by the spring 67. Freely rotatable upon the end of rod 66 is the hub 68 operable by the handle 68a. On the outer face of the hub 68 is the enlarged head 66a of rod 66. The engaging faces of hub 68 and casing 65 are of cam form so that in one position of handle 68a the rod 66 and shoe 64 are cammed out of contact with the brake drum, whereas in another position of the handle the drum is engaged by the shoe impelled by the spring 67.

The mounting of the turret 48 by which the frame 46 and the workholders may be rotated in a horizontal plane is best seen in Fig. 4. A centrally located shaft 69 on the turret 48 enters a suitable recess in the plate 49 and serves as a king pin. Also on the upper face of plate 49 is arranged an annular series of rollers 70 engaging the lower face of the turret plate 48 so as to support the same for substantially frictionless rotation. These rollers 70 are journalled in spaced annular flanges on the upper surface of plate 49 as shown in Figs. 3 and 4. In the embodiment shown manual means is relied upon for rotating the turret and the latter is held in either of two positions by a keeper 71 which engages one or the other of the diametrically oppositely disposed pins 72 on the lower face of the turret plate 48. The keeper 71 is carried by a suitable housing 73 fastened to the plate 49 and biased inwardly by a spring 74. For manipulation of this keeper it is connected by the flexible member 75 (which may be a chain or cable) with the arm 76a of bellcrank 76 which is pivotally mounted on the frame 10. The other arm of the bellcrank 76b is connected with the rod 77 extending vertically to a position handy for the operator. A spring 78 considerably lighter than the spring 74 biases bellcrank 76 in a counterclockwise direction to take up the slack in the flexible member 75. Depression of the rod 77 thus releases the keeper 71 and permits rotation of the turret 48.

Work holding means is arranged on the frame 46. As shown, the frame 46 includes the side channel members 79 and suitable cross frame members such as the end member 80. Carried by this frame are a plurality of brackets 81 which support guide bars 82 which pass through suitable openings in the upstanding pillar members 83 and 84. Rotatably mounted in each pillar is a head member in the form of a ring gear 85 and 86, which head members are arranged mutually facing and provided with means for holding one or more work pieces between them. Movement of the pillars toward and from each other is provided so as to accommodate between them work pieces of varying length. This means comprises a screw 87 extending longitudinally of the frame 46 and passing through threaded brackets in the two pillars. The screw 87 is provided with a right-handed thread on one side of the turret axis 69 and a left-handed thread on the other side thereof as indicated at 87a and 87b, Fig. 9. Thus rotation of the screw 87 simultaneously moves the pillars either toward or away from each other. Rotation of the screw 87 is accomplished by a handle 88. Preferably one of these handles is provided at each end of the frame 46 so that the screw 87 may be manipulated from either end of the frame. Preferably, as stated above, the division between the right and left-hand threads on the screw 87 occurs substantially above the axis 69 of the turret. The pillars are spaced substantially equally on opposite sides of this point and as they are moved equally toward and from each other by rotation of the screw 87 they are thus at all times substantially equally spaced from the axis 69 about which the turret 48 rotates. Thus the load is always substantially balanced about the axis of rotation of the turret.

Means is provided for rotating the head members 85 and 86. This structure is operatably mounted upon a bracket 89 and preferably the structure is duplicated at opposite ends of the frame 46 so as to be available for manipulation from the operator's platform or from the other end of the apparatus in either of the rotated positions of frame 46. This structure is the same at each end and comprises a handwheel 90 rotatably mounted in the bracket 89 and adapted to turn a shaft 91 and a sprocket 92 mounted thereon. A chain 93 connects the latter sprocket with a sprocket 94 mounted on a stub shaft 95 carried by frame 46. This stub shaft also carries a pinion 96 which engages a pinion 97 on shaft 98 which runs longitudinally of frame 46. On shaft 98 are pinions 99 and 100 which have a splined connection with shaft 98 which provides a driving relationship between the shaft and pinions as they are moved relative to each other. Pinions 99 and 100 are supported by brackets 101 and 102 respectively from their associated pillars 83 and 84 so as to be carried therewith. Pinion 99 through idler pinion 103 mounted on pillar 83 drives the ring gear 85. Pinion 100 in a similar manner through pinion 104 drives ring gear 86.

Figure 8:
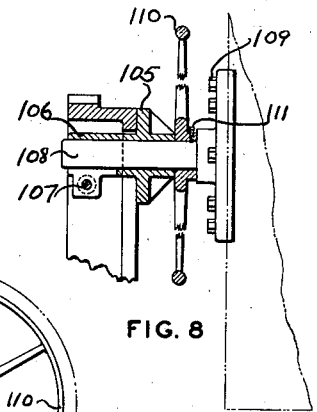
Fig. 8 is a detail sectional view taken on the line 8—8 of Fig. 2.

One feature of my invention involves the mounting of a plurality of work pieces or cylinders between the head members 85 and 86. To this end spaced at 120° intervals about the rings 85 and 86 are journals 105 adapted to receive gudgeons or workholders adapted for connection with the end heads of the cylinders to be fabricated. As best seen in Fig. 8, each journal has associated therewith a fixed collar portion 106 provided with a clamping bolt 107.

In placing cylinders in position between the workholders 85 and 86, gudgeons 108 are placed in the journals 105, the pillars are adjusted the proper distance apart and the cylinder framework is placed between the plate portions of opposing gudgeons which are then bolted to the cylinder framework at 109. It will be understood that the gudgeons 108 are work-supporting members used only during the fabricating process. By tightly clamping collars 106 in place, a cylinder is held in proper position longitudinally and is at the same time prevented from rotating. In the course of fabrication it may be necessary to change the position of the cylinder by rotating it in the journals 105 either for welding an arcuate seam or for presenting a different side of the cylinder structure to the welding tool. This is accomplished by loosening the clamping screw 107 and rotating the cylinder by means of the handwheel 110 which is secured to the gudgeon 108 as by means of the set screw 111. When the cylinder has been moved to its new position, a tightening of bolt 107 will hold it there if desired.

To prevent rotation of the head members 85 and 86 when such rotation would be undesirable, a pair of opposed detents 112 may be provided as shown on pillar 83 adapted to engage the teeth of the ring gear 85 in opposition to each other.

Cylinders may be supported between the head members 85 and 86 in various manners. For instance three similar cylinders might be so supported, or as shown in Fig. 1, a plurality of cylinders might be arranged in one of the three positions and connected in a manner to give a total length equal to one of the longer cylinders. For instance as shown in Fig. 1, two shorter cylinders 113 and 114 may be arranged with the end gudgeons nearer the workholders supported as shown in Fig. 8 and with a special gudgeon 115 rigidly connected to the mutually facing cylinder heads so as to rigidly connect the plurality of cylinders between the head members 85 and 86. It is obvious that more than two cylinders might be thus supported in one line and that a plurality of sets might be arranged between the various sets of gudgeons 108.

Figure 2:
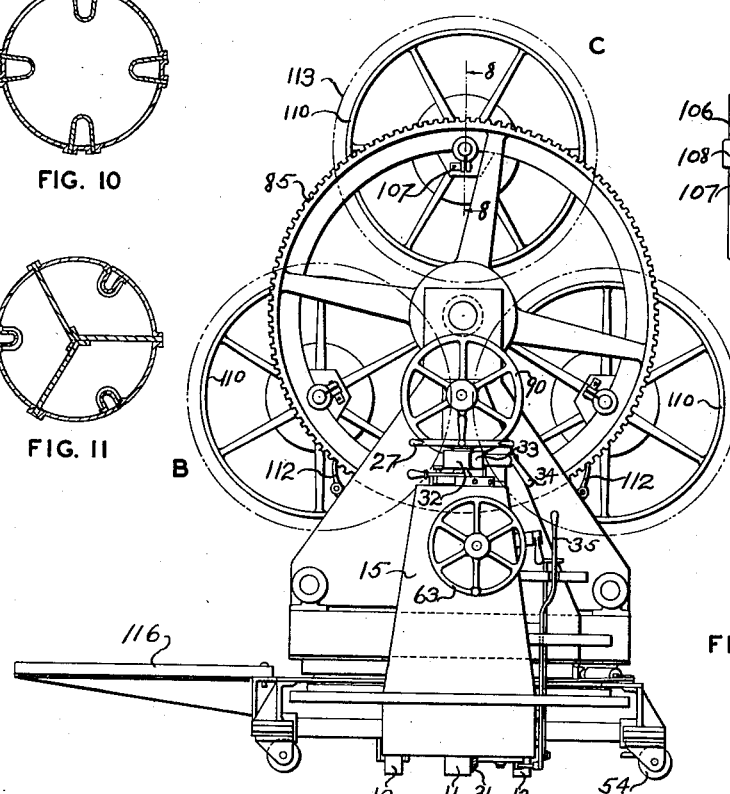
Fig. 2 is an elevation of the control end of the apparatus of Fig. 1.

To illustrate one use of my described apparatus, I will explain the operation of fabricating simultaneously three cylinders of the type illustrated, described and claimed in Patent No. 1,998,566, granted to Charles E. Waream, April 23, 1935. A diagrammatic transverse section of that type of cylinder is shown in Fig. 10. In the fabrication of such a cylinder the head sheets, transmitters and vertical partition plates, if any, are first secured to the four lifting ribs in a manner not necessary to be described here, thus forming a cylinder framework or skeleton. Three such similar frameworks or skeletons are then arranged between gudgeons 108 in journals 105 in the three positions indicated in Fig. 2. The first assembly or fitting operation is performed at the position marked "B" in Fig. 2 where workmen standing upon platform 16 clamp a set of cylinder sheets to the cylinder framework, say in the position of those sheets opposite the cylinder door openings. The head members 85 and 86 are then rotated by means of handwheel 90, bringing the first cylinder to position C and placing a second cylinder at position B. Similar cylinder sheets are then clamped to the framework of the second cylinder and the head members are again rotated bringing a third cylinder to the position B for the first assembly operation and bringing the first cylinder from position C to position A for the first welding operation thereon. The apparatus is now moved into position close to the welding machine for a welding operation. To do this the handwheel 27 is rotated while caster 11 is steered by handle 19 and casters 12 and 13 steered by handle 35 in the proper direction to swing one or both ends of the chassis diagonally toward the welding machine. When the desired position of the truck chassis has been effected, the carriage 47 may be moved laterally by rotation of the handwheel 63, if necessary, to properly position the work to the welding electrodes. Welding operations are then performed on the cylinder in position A to secure the body sheet to the peripheral flange of a vertical partition, with the operator inching the cylinder frame by manipulation of wheel 110 so as to spot weld the cylinder sheets in position, making one or more circumferential seams of the cylinder. While this fabricating operation is occurring at position A, an assembling operation is being carried on at position B.

The platform 116 is secured to the chassis frame 10 on the side opposite the welding machine. Upon it workmen may stand for the assembling or fitting operation at the position B while the truck chassis is being moved to perform the welding operation at position A. Since these operations generally take approximately the same time, when both are finished the head members 85 and 86 are again rotated, moving the first cylinder from position A to position B and moving the second cylinder from position C to position A for the welding operation similar to that just described.

The next step at position B is the placing of another set of cylinder sheets in proper position on the cylinder framework. These sheets eventually, by the step by step process outlined, reach position A and are welded to the structure. Each of the cylinder assemblies progresses in the same manner, the various cylinder sheets, ribs and fill-pieces being placed in position in predetermined assembly steps and, by rotation of the head members 85 and 86, the parts are brought one by one to fabricating position.

Certain of the welded seams occur longitudinally of the cylinder, some inside and some outside. For such operations the work is properly positioned to the welding points, the casters 11, 12 and 13 are set for straight line movement, and the cylinder structure is then inched by rotating wheel 27. By noting the successive positions of wheel 27 the welds may be spotted along the seam at the desired spacing.

In the above described series of welding operations the electrodes have to be changed a number of times. This is because the parts to be reached and the openings in the cylinder structure for reaching them vary from time to time during the assembly operation. With a plurality of cylinders being operated upon, as shown with my improved supporting apparatus, all of the cylinders are fabricated with the same number of electrode changes as would be otherwise necessary if only one cylinder were fabricated.

At certain points in cylinder fabrication it is necessary to swing the frame 46 end for end and whereas this operation as formerly accomplished took a great deal of time and space and required reversal of the entire chassis with reference to the welding machine, with my improved apparatus it is only necessary to move the carriage 47 laterally away from the welding machine, move the truck chassis on a fixed steering line a short distance, swing the turret 48 and then return the truck chassis and carriage 47 to their original positions. This is very helpful as it does not disturb the main setting of the truck chassis and maintains the position of the operator at the same end of the truck chassis where his vision toward the welding machine is arranged to be unobstructed at all times.

The driving means for the truck chassis preferably should be so balanced about the longitudinal axis of the chassis that the truck will hold a straight line on the floor. To this end I have placed the single driving caster 11 approximately on the longitudinal axis of the truck chassis but other means of insuring straight line chassis movement will occur to those skilled in this art.

Figure 11:
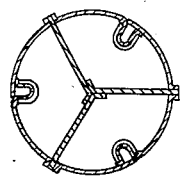

In connection with the welding operations I have described the inching movement of the truck chassis under control of handwheel 27 so as to spot the welds longitudinally of the cylinder. In a similar manner it is possible to produce an inching operation for spacing welds transversely of the cylinder by marking the movement of handwheel 63 which controls the lateral movement of carriage 47. By this means the carriage and the work supported thereby may be inched toward and from the welding electrodes. Such an operation would occur, for instance, in welding the Y-partitions of a pocket cylinder, a transverse section of which is illustrated in Fig. 11.

What I claim is:

1. Work holding apparatus comprising a truck chassis, a turret rotatable on a vertical axis on said chassis, a horizontally extending elongated frame on said turret, two pillars adjustable toward and from each other on said frame, said pillars being on opposite sides of the turret axis and substantially equally spaced therefrom, means on each pillar for supporting the opposite sides of the work located between said pillars, and mechanism for adjusting said pillars along said frame while maintaining them equally spaced from said turret axis, whereby work supported between said pillars is always substantially balanced on said turret.

2. Work supporting apparatus comprising an elongated wheeled chassis provided at one end with an operator's platform, manually controllable steering and propelling means for said chassis accessible to an operator on said platform, a turret mounted near the other end of said chassis for rotation about a vertical axis, a horizontally disposed elongated frame on said turret and extending beyond said other end of said chassis when the turret is moved to aline the frame with the chassis, mutually facing work supporting means on opposite ends of said frame, said frame and work supporting means being centered as to weight and thereby balanced about said turret axis, and adjusting means for moving said work supporting means toward and from each other in equal increments for different size work pieces while also maintaining a balance about said turret axis.

3. Work supporting apparatus comprising an elongated wheeled chassis carrying an operator's platform at one end, manually controllable steering and propelling means therefor accessible to an operator upon said platform, a carriage mounted upon the other end of said chassis for transverse adjustment thereon, adjusting means therefor accessible to an operator upon said platform, an elongated frame mounted in balance about its intermediate portion upon said carriage and extending beyond the end of said chassis, two pillar members mounted upon said frame and adjustable uniformly toward and from each other without disturbing its balance upon said carriage, work supporting means carried by each of said pillar members for supporting opposite sides of the work and adjusting means for said pillar members accessible to an operator upon said platform.

4. Work supporting apparatus comprising an elongated wheeled chassis provided at one end with an operator's platform, manually controllable steering and propelling means for said chassis accessible to an operator on said platform, a carriage mounted near the other end of said chassis for movement transversely relative to said chassis, a turret mounted on said carriage for rotation about a vertical axis, a horizontally disposed elongated frame on said turret and extending beyond said other end of said chassis when the turret is moved to aline the frame with the chassis, mutually facing work supporting means on opposite ends of said frame, and said frame and work supporting means being centered as to weight and thereby balanced about said turret axis.

5. Work supporting apparatus as in claim 2 wherein adjusting means is provided for moving said work supporting means toward and from each other in equal increments for different size work pieces while also maintaining a balance about said turret axis, and operating means for said adjusting means is provided at both ends of said frame so that one thereof is accessible to said operator when either end of said frame extends beyond said chassis.

6. Work supporting apparatus comprising an elongated wheeled chassis carrying an operator's platform at one end, manually controllable steering and propelling means therefor accessible to an operator upon said platform, a carriage mounted upon the other end of said chassis for adjustment transversely thereon, adjusting means therefor accessible to an operator upon said platform, an elongated frame mounted in balance about its intermediate portion upon said carriage and extending beyond the end of said chassis, two pillar members mounted upon said frame and means for adjusting said pillar members uniformly toward and from each other without disturbing the balance of said frame and pillar members upon said carriage, two rotatable head members mounted coaxially one upon each pillar member, each thereof being provided with a plurality of rotatable work holders, the axis of rotation of the head members and work holders being horizontal and parallel, said work holders being arranged in pairs of opposed facing work holders with the work holders of a pair being one on each head, each pair thereof being adapted to support work mounted between them, and the pairs being so distributed around the head member axes as to simultaneously present work at opposite sides of the chassis, a portion of said apparatus extending transversely of and beyond said chassis, a platform on said portion for supporting workmen fabricating work presented at that side of said chassis, and wheel means on said carriage for supporting it laterally outside of its support on the chassis.

FRANK VETORINO.